(12) United States Patent
Lim (10) Patent No.: US 10,787,031 B2
(45) Date of Patent: Sep. 29, 2020

(54) ASSEMBLY OF OUTER RING AND KNUCKLE, AND WHEEL BEARING ASSEMBLY INCLUDING SAME

(71) Applicant: ILJIN GLOBAL CO., LTD, Seoul (KR)

(72) Inventor: Jong Keun Lim, Seoul (KR)

(73) Assignee: ILJIN GLOBAL CO., LTD, Seoul (KR)

( * ) Notice: Subject to any disclaimer, the term of this patent is extended or adjusted under 35 U.S.C. 154(b) by 0 days.

(21) Appl. No.: 16/360,236

(22) Filed: Mar. 21, 2019

(65) Prior Publication Data
US 2019/0291510 A1 Sep. 26, 2019

(30) Foreign Application Priority Data

Mar. 21, 2018 (KR) .................. 10-2018-0032662

(51) Int. Cl.
*F16C 35/067* (2006.01)
*B60B 27/00* (2006.01)
*F16C 43/04* (2006.01)
*B60B 27/06* (2006.01)

(52) U.S. Cl.
CPC ........ *B60B 27/0089* (2013.01); *B60B 27/065* (2013.01); *F16C 43/04* (2013.01); *B60B 2320/10* (2013.01); *B60B 2380/90* (2013.01)

(58) Field of Classification Search
CPC . B60B 27/0089; B60B 27/065; F16C 19/184; F16C 19/186; F16C 35/067; F16C 43/04; F16C 2326/02
See application file for complete search history.

(56) References Cited

U.S. PATENT DOCUMENTS

| 4,990,000 | A  | * | 2/1991 | Harsdorff | .............. | B60B 27/001 301/105.1 |
| 8,690,448 | B2 | * | 4/2014 | Shitsukawa | ......... | B60B 27/0005 384/544 |
| 8,790,017 | B2 | * | 7/2014 | Ohtsuki | .............. | B60B 27/0005 384/544 |

FOREIGN PATENT DOCUMENTS

JP 2014040861 A * 3/2014 ............ F16C 35/067

* cited by examiner

*Primary Examiner* — Phillip A Johnson
(74) *Attorney, Agent, or Firm* — Dinsmore & Shohl LLP; Yongsok Choi, Esq.

(57) ABSTRACT

An assembly of an outer ring and a knuckle comprises an outer ring used in a wheel bearing and a knuckle for connecting the outer ring to a suspension system. The outer ring comprises a body having a hollow formed in an axial direction of a rotation axis, a mounting portion extending in an outer radial direction and a circumferential direction of the body and having a plurality of first mounting holes formed thereon, and at least one mating protrusion formed on an outer circumferential surface of the body. The knuckle comprises a step portion configured to mate with the mating protrusion in an axial direction of the body. A plurality of second mounting holes corresponding to the plurality of first mounting holes are formed on the knuckle. The mating protrusion has one of a plurality of mating shapes having different shapes.

15 Claims, 10 Drawing Sheets

ASSEMBLY OF OUTER RING AND KNUCKLE, AND WHEEL BEARING ASSEMBLY INCLUDING SAME

CROSS-REFERENCE TO RELATED APPLICATION

This application claims priority to and the benefit of Korean Patent Application No. 2018-0032662, filed on Mar. 21, 2018, the disclosure of which is incorporated herein by reference in its entirety.

BACKGROUND

Field of the Invention

The present disclosure relates to an assembly of an outer ring and a knuckle and a wheel bearing assembly including the same.

Discussion of Related Art

A wheel of a vehicle is connected to a chassis of the vehicle via a wheel bearing. The wheel bearing rotates the wheel and supports a load applied to the wheel. The wheel bearing may comprise a bearing hub, an inner ring, an outer ring, and rolling elements which perform rolling movement. The wheel may be mounted to the bearing hub to be rotated therewith. The bearing hub may be rotatably supported on the outer ring and may be coupled to an axle.

For example, the wheel bearing may be connected to the chassis by a knuckle. The knuckle connects the wheel bearing to a suspension system of the chassis. The outer ring of the wheel bearing may be coupled to the knuckle.

SUMMARY OF THE INVENTION

According to embodiments of the present disclosure, there is provided an assembly of an outer ring and a knuckle, which is capable of preventing assembling of an outer ring and a knuckle which are not paired by employing an outer ring and a knuckle which are configured to be paired. Further, according to the embodiments of the present disclosure, there is provided a wheel bearing assembly comprising an assembly of an outer ring and a knuckle, which is capable of preventing incorrect assembling.

One aspect of embodiments of the present disclosure relates to an assembly of an outer ring and a knuckle. The assembly of the outer ring and the knuckle according to one embodiment of the present disclosure comprises an outer ring used in a wheel bearing and a knuckle for connecting the outer ring to a suspension system. The outer ring may comprise a body having a hollow formed in an axial direction of a rotation axis, and a mounting portion extending in an outer radial direction and a circumferential direction of the body and having a plurality of first mounting holes formed thereon. The knuckle may be configured to accommodate a portion of the body in the axial direction, and a plurality of second mounting holes corresponding to the plurality of first mounting holes are formed in the knuckle. The outer ring may comprise one of a mating protrusion and a step portion into which the mating protrusion is inserted when the step portion is matched with the mating protrusion in the axial direction of the body. The knuckle may comprise the other one of the mating protrusion and the step portion. The mating protrusion has one of a plurality of mating shapes having different shapes.

In one embodiment of the present disclosure, the step portion may have an annular shape extending in a circumferential direction. The step portion may have an annular-shaped axial mating surface extending in the circumferential direction.

In one embodiment of the present disclosure, the mating protrusion may have an axial mating surface which is brought into with the step portion in an axial direction. The axial mating surface of the mating protrusion may extend in circumferential direction and may be curved.

In one embodiment of the present disclosure, the outer ring and the knuckle may be assembled with a gap between the mating protrusion and the step portion.

In one embodiment of the present disclosure, the mating protrusion and the step portion are disposed such that the plurality of first mounting holes and the plurality of second mounting holes are aligned when the outer ring and the knuckle are assembled in the axial direction.

In one embodiment of the present disclosure, the body may have an insertion portion formed between an axial end portion and the mounting portion and the mating protrusion formed on the mounting portion and the insertion portion. The knuckle may have a knuckle housing formed to accommodate the insertion portion in the axial direction and the step portion formed between an axial end surface of the knuckle housing and an inner circumferential surface of the knuckle housing. The plurality of second mounting holes may be formed on the axial end surface of the knuckle housing. An inner circumferential surface of the knuckle housing may be formed to be fitted onto an outer circumferential surface of the insertion portion in the axial direction.

In one embodiment of the present disclosure, the assembly of the outer ring and the knuckle may further comprise a plurality of bolts engaged to the plurality of first mounting holes and the plurality of second mounting holes.

Another aspect of the embodiments of the present disclosure relates to a wheel bearing assembly. The wheel bearing assembly according to one embodiment of the present disclosure comprises a bearing hub, an outer ring, rolling elements disposed between the bearing hub and the outer ring, and a knuckle configured to connect the outer ring and a suspension system. The bearing hub may be configured to be coupled to a wheel to be rotated therewith around a rotation axis. The outer ring may comprise a body having a hollow formed in an axial direction of a rotation axis and configured to surround a portion of the bearing hub, and a mounting portion extending in an outer radial direction and a circumferential direction of the body and having a plurality of first mounting holes formed thereon. The knuckle may be configured to accommodate a portion of the body of the outer ring. A plurality of second mounting holes corresponding to the plurality of first mounting holes may be formed on the knuckle. The outer ring may comprise one of a mating protrusion and a step portion into which the mating protrusion is inserted when the step portion is matched with the mating protrusion in the axial direction of the body. The knuckle may comprise the other one of the mating protrusion and the step portion. The mating protrusion has one of a plurality of mating shapes having different shapes.

In one embodiment of the present disclosure, the step portion may have an annular shape extending in a circumferential direction.

In one embodiment of the present disclosure, the mating protrusion may have an axial mating surface which is brought into contact with the step portion in the axial direction, and the step portion may have an annular-shaped axial mating surface which is brought into contact with the axial mating surface of the mating protrusion and extends in a circumferential direction. The axial mating surface of the mating protrusion may extend in the circumferential direction and may be curved.

In one embodiment of the present disclosure, the body may have an insertion portion formed between an axial end portion and the mounting portion, and the mating protrusion formed on the mounting portion and the insertion portion. The knuckle may have a knuckle housing formed to accommodate the insertion portion in the axial direction and the step portion formed between an axial end surface of the knuckle housing and an inner circumferential surface of the knuckle housing. The plurality of second mounting holes may be formed on the axial end surface of the knuckle housing.

Since various sorts of vehicles are assembled in a vehicle assembly line, incorrect assembling may be performed between an outer ring and a knuckle which are not paired. Since a variety of vehicle trims are present on one sort of vehicle according to options applied to the vehicle and the knuckle may have various dimensions in inner diameter thereof according to the vehicle trims, incorrect assembling between the out ring and the knuckle may be performed even in the same sort vehicle in the vehicle assembly line. However, according to an assembly of an outer ring and a knuckle according to various embodiments of the present disclosure, due to a mating portion provided in each of the outer ring and the knuckle, only an outer ring and a knuckle, each having an outer diameter and an inner diameter which are paired, can be assembled. That is, the assembly of the outer ring and the knuckle according to the embodiments of the present disclosure can prevent incorrect assembling of an outer ring and a knuckle which are not paired. Consequently, an outer ring according to one embodiment of the present disclosure cannot be assembled with a knuckle which have an inner diameter that is greater than an outer diameter of the outer ring and belongs to a different sort. Further, in accordance with the assembly of the outer ring and the knuckle according to the various embodiments of the present disclosure, due to the mating portion provided in each of the outer ring and the knuckle, the outer ring and the knuckle can be aligned in an axial direction or a radial direction.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Embodiments of the present disclosure are exemplified for the purpose of describing the technical spirit of the present disclosure. The scope of the claims according to the present disclosure is not limited to the embodiments described below or to the detailed descriptions of these embodiments.

Unless otherwise defined, all technical and scientific terms used herein have the same meaning commonly understood by those skilled in the art to which the present disclosure pertains. All terms used herein are selected for the purpose of more clearly describing the present disclosure and not limiting the scope of the present disclosure defined by appended claims.

Unless the phrase or sentence clearly indicates otherwise, terms "comprising," "including," "having," "taking," and the like used herein should be construed as open-ended terms encompassing the possibility of including other embodiments.

The singular form described herein may include the plural form unless the context clearly dictates otherwise, and this is equally applied to the singular form set forth in the claims.

Terms a "first," a "second," and the like are used to distinguish a plurality of components, and the order or importance of corresponding components is not limited by these terms.

Throughout this disclosure, when a component is referred to as being "connected" or "coupled" to another component, the component can be directly connected or coupled to another component or can be directly connected or coupled to another component by intervening any other component therebetween.

A directional directive of an "outer radial direction" used herein means a direction away from a rotation axis among radial directions with respect to the rotation axis of a rotating body, and a directional directive of an "inner radial direction" means a direction opposite the outer radial direction. The directional directive of the "radial direction" includes at least one of the outer radial direction and the inner radial direction. Further, a directional directive of an "outer axial direction" used herein means a direction toward a wheel along the rotation axis, and a directional directive of an "inner axial direction" means a direction opposite to the outer axial direction along the rotation axis. A directional directive of an "axial direction" includes at least one of the outer axial direction and the inner axial direction.

Hereinafter, embodiments will be described with reference to the accompanying drawings. In the accompanying drawings, the same reference numerals are assigned to the same or corresponding components. Further, in the following description of the embodiments, an overlapping description of the same or corresponding components may be omitted. However, even though a description of a component is omitted, such a component is not intended to be excluded in any embodiment.

Embodiments described below and examples shown in the accompanying drawings relate to an assembly of an outer ring used in a wheel bearing and a knuckle configured to connect the outer ring to a suspension system (hereinafter, simply referred to as an "outer ring-knuckle assembly"), and a wheel bearing assembly comprising the outer ring-knuckle assembly. The outer ring-knuckle assembly according to the embodiments of the present disclosure may be employed in a wheel bearing which is coupled to a driven wheel or a non-driven wheel.

Figure 1:
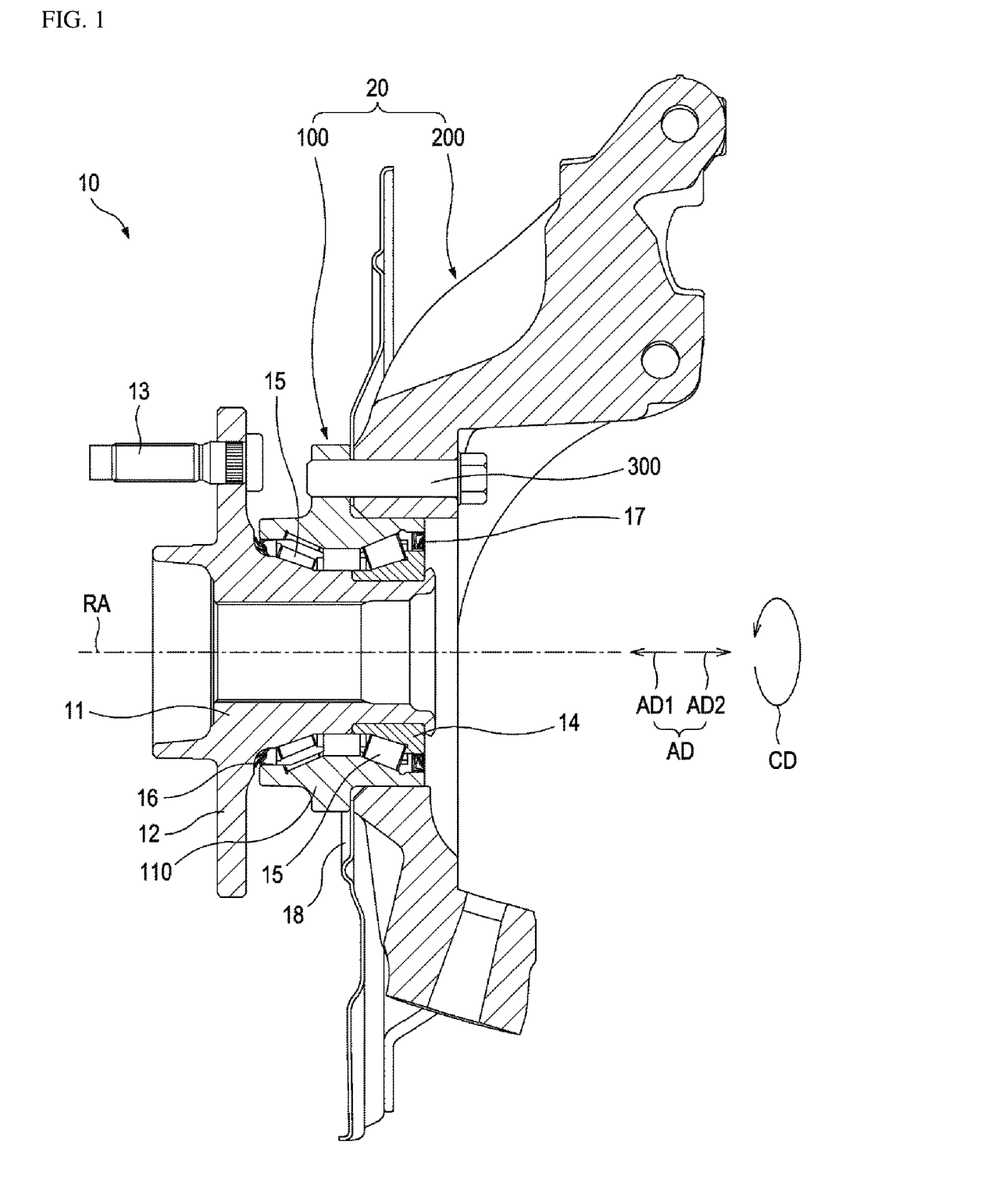
FIG. 1 is a longitudinal sectional view of a wheel bearing assembly comprising an assembly of an outer ring and a knuckle according to one embodiment of the present disclosure.

FIG. 1 is a longitudinal sectional view of a wheel bearing assembly comprising an assembly of an outer ring and a knuckle according to one embodiment of the present disclosure;

A wheel bearing assembly 10 according to one embodiment of the present disclosure comprises a bearing hub 11, an inner ring 14, rolling elements 15, and an outer ring-knuckle assembly 20 according to one embodiment of the present disclosure. The outer ring-knuckle assembly 20 comprises an outer ring 100 and a knuckle 200. The outer ring 100 and knuckle 200 are coupled via a plurality of bolts 300.

The bearing hub 11 is configured to be coupled to a wheel (not shown) of a vehicle, such as a driven wheel or a non-driven wheel, and to be rotated with the wheel around a rotation axis RA. The bearing hub 11 may be coupled to a drive wheel. Further, a flange 12 extending in an outer axial direction AD1 may be formed on the bearing hub 11. The bearing hub 11 may be coupled to the wheel by wheel bolts 13 engaged with the flange 12.

The inner ring 14 is mounted on an outer circumferential surface of the bearing hub 11 and rotates with the bearing hub 11. The inner circumferential surface of the inner ring 14 is press-fitted onto an outer circumferential surface of the bearing hub 11 to be fixed thereto.

The outer ring 100 may serve as a fixing component of the wheel bearing. The outer ring 100 comprises a body 110 configured to surround the inner ring 14 and a portion of the bearing hub 11. The outer ring 100 is coupled to the knuckle 200 to be fixed and supported thereon. The knuckle 200 is configured to connect the wheel bearing to a suspension system of a chassis. Specifically, the knuckle 200 connects the outer ring 100 to a part constituting the suspension system. The outer ring 100 may be coupled to the knuckle 200 via a splash shield 18. The splash shield 18 prevents an inflow of foreign materials such as storm water, sludge water, and the like.

A plurality of rolling elements 15 are disposed between the bearing hub 11 and the outer ring 100 and between the inner ring 14 and the outer ring 100. Referring to FIG. 1, the rolling elements 15 may be a tapered roller. The plurality of rolling elements 15 are disposed in two rows in a circumferential direction CD. A plurality of rolling elements 15 in one row are disposed between the bearing hub 11 and the outer ring 100, and a plurality of rolling elements 15 in another row are disposed between the inner ring 14 and the outer ring 100.

The wheel bearing assembly 10 may comprise an outer seal 16 and an inner seal 17 which prevent foreign materials from flowing into a space in which the rolling elements 15 perform rolling movement. The outer seal 16 is fitted in an annular gap formed between the bearing hub 11 and the outer ring 100, and the inner seal 17 is fitted in an annular gap formed between an outer circumferential surface of the inner ring 14 and an inner circumferential surface of the outer ring 100.

Alternatively, the wheel bearing assembly 10 may be configured such that rolling elements 15 in one or more rows are brought into contact with only the inner ring 14 and the outer ring 100. Alternatively, the wheel bearing assembly may not comprise the inner ring 14. In this case, the wheel bearing assembly may comprise rolling elements 15 disposed between the bearing hub 11 and the outer ring 100.

According to a size of the wheel, a load applied to the wheel, and the like, parts of the wheel bearing are different from each other in dimension, and the outer ring also has various dimensions in outer diameter thereof. According to specifications of a vehicle, the knuckle also has various dimensions in inner diameter thereof. At a site in which the outer ring and the knuckle are assembled, outer rings having various dimensions in outer diameter thereof and knuckles having various dimensions in inner diameter thereof may be provided. If the outer ring and the knuckle which are configured to be paired are not assembled, it may be difficult to perform a subsequent assembly process or to ensure normal operation of a vehicle with such an outer ring and such a knuckle. At the site in which the outer ring and the knuckle are assembled, an outer ring and a knuckle which are not configured to be paired may be incorrectly assembled due to a mistake of an operator. Therefore, there is a need for an outer ring and a knuckle to have a configuration for structurally preventing incorrect assembling.

The outer ring-knuckle assembly 20 according to one embodiment of the present disclosure has an error proofing structure capable of preventing incorrect assembling. That is, in the outer ring-knuckle assembly 20 according to one embodiment of the present disclosure, the error proofing structure is provided in the outer ring 100 and the knuckle 200 to prevent the outer ring 100 or the knuckle 200 from being assembled with an outer ring or a knuckle which belongs to a sort different from that of the outer ring 100 or the knuckle 200. Consequently, in the outer ring-knuckle assembly 20 according to one embodiment of the present disclosure, only an outer ring and a knuckle, which belong to the same sort and are configured to be paired, can be assembled and incorrect assembling of the outer ring and the knuckle can be prevented. Further, the outer ring-knuckle assembly 20 according to one embodiment of the present disclosure allows the outer ring and the knuckle, which belong to the same sort and are configured to be paired, to be arranged and assembled in an axial direction or a radial direction.

Figure 2:
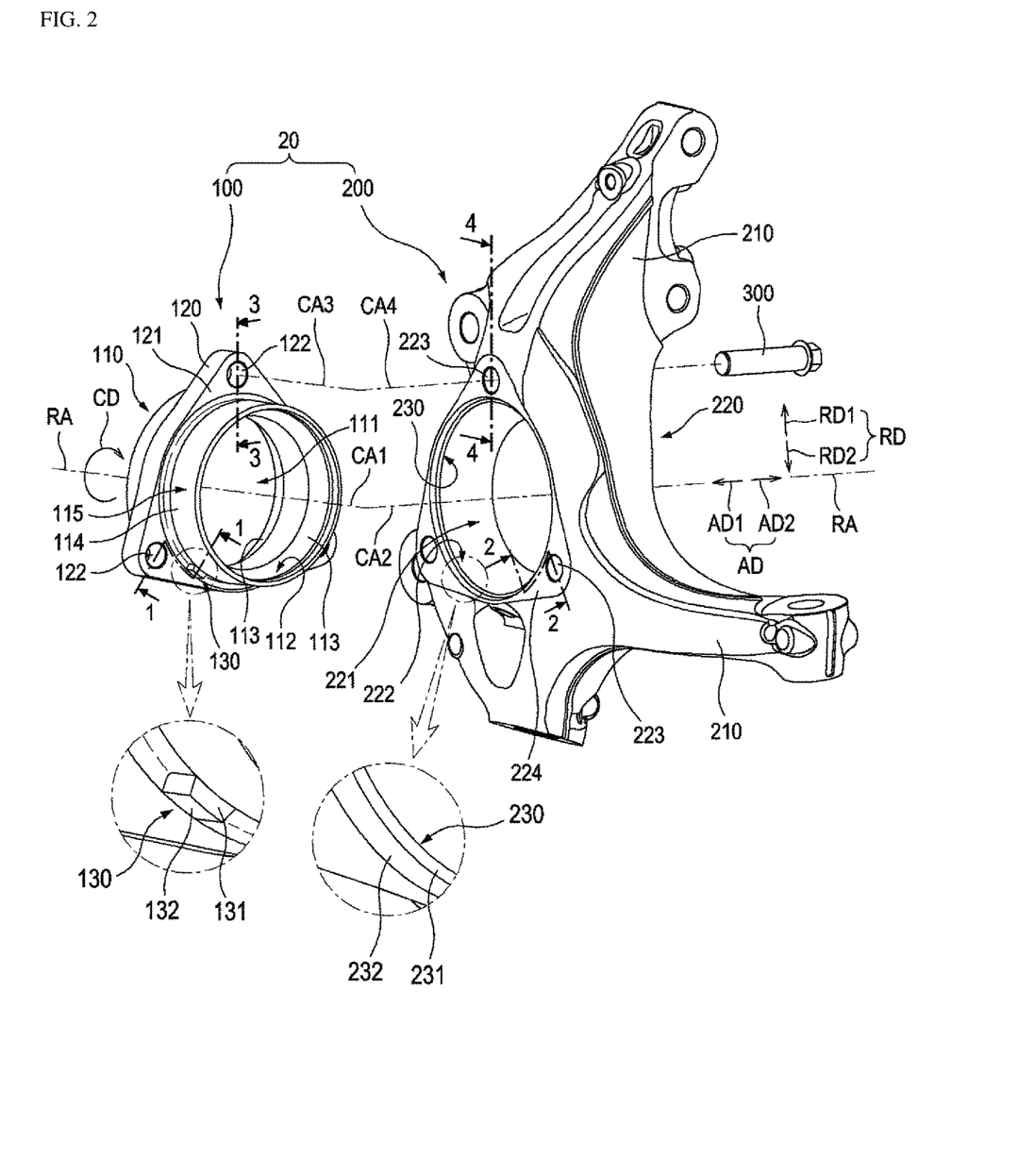
FIG. 2 is an exploded perspective view illustrating the assembly of the outer ring and the knuckle according to one embodiment of the present disclosure.

FIG. 2 is an exploded perspective view illustrating the assembly of the outer ring and the knuckle according to one embodiment of the present disclosure.

According to one embodiment of the present disclosure, the outer ring 100 comprises the body 110 and a mounting portion 120 having a plurality of first mounting holes 122 formed therein.

The body 110 of the outer ring 100 is formed in a substantially cylindrical shape and has a hollow 111 which is open in an axial direction AD. Thus, the body 110 has a central axis CA1 extending through a center of the hollow 111 in the axial direction AD, an inner circumferential surface 112 which is a surface of the hollow 111, and an outer circumferential surface 114 which is an outer surface of the body 110. The central axis CA1 may be coaxial with the rotation axis RA of the wheel bearing assembly.

The body 110 may be brought into contact with the rolling elements 15 shown in FIG. 1 on the inner circumferential surface 112. The inner circumferential surface 112 has a pair of raceway surfaces 113 in contact with the rolling elements 15. The raceway surfaces 113 may be formed in a flat surface extending in an annular shape to be brought into close contact with the rolling elements 15 such as a tapered roller.

The mounting portion 120 serves as a structure for mounting the outer ring 100 to the knuckle 200. The mounting portion 120 extends in an outer radial direction RD1 and the circumferential direction CD of the body 110. Referring to FIG. 2, the mounting portion 120 may have a round triangular shape. A surface of an inner axial direction AD2 of the mounting portion 120 acts as a mounting surface 121 to which the knuckle 200 is coupled.

A plurality of first mounting holes 122 may be disposed at regular intervals in the circumferential direction CD of the body 110. Alternatively, the plurality of first mounting holes 122 may be disposed at irregular intervals. The first mounting holes 122 may pass through the mounting portion 120 in parallel with the central axis CA1 The first mounting holes 122 are located in the vicinity of each of vertexes of the triangular shape of the mounting portion 120. A female thread may be formed on a surface of the first mounting holes 122. Accordingly, a male thread of the bolt 300 is thread-engaged to the female thread of the first mounting holes 122 such that the outer ring 100 may be coupled to the knuckle 200 in the axial direction AD and a radial direction RD.

In one embodiment of the present disclosure, the body 110 may have a cylindrical insertion portion 115 inserted into the knuckle 200. The insertion portion 115 may be located between an end portion of the body 110 in the inner axial direction AD2 and the mounting portion 120, and the insertion portion 115 may be brought into contact with the mounting portion 120.

The knuckle 200 is configured to support the wheel bearing assembly and connect the outer ring 100 to the suspension system of the chassis. A plurality of second mounting holes 223 may be formed in the knuckle 200 to couple the outer ring 100 to the knuckle 200. The plurality of second mounting holes 223 respectively correspond to the plurality of first mounting holes 122 of the outer ring 100. The bolt 300 engaged with the first mounting hole 122 passes through the first mounting hole 122 and the second mounting hole 223, which correspond to each other, to couple the outer ring 100 to the knuckle 200.

The knuckle 200 may include a plurality of knuckle arms 210 and a knuckle housing 220. The knuckle arms 210 are formed extending from the knuckle housing 220. The knuckle 200 may be rotatably coupled to a part (e.g., a suspension arm) constituting the suspension system at a free end of the knuckle arms 210.

The knuckle housing 220 has a cylindrical knuckle bore 221, and the knuckle 200 is configured to accommodate a portion of the body 110 of the outer ring 100 (e.g., the insertion portion 115) in the knuckle bore 221 in the axial direction AD. An inner circumferential surface 222 of the knuckle housing 220 (e.g., an inner circumferential surface of the knuckle bore 221) is formed to be fitted onto the outer circumferential surface 114 of the body 110 (e.g., an outer circumferential surface of the insertion portion 115) in the axial direction AD. The inner circumferential surface 222 of the knuckle housing 220 may be coupled to the outer circumferential surface of the insertion portion 115 by a transition fit or a clearance fit. Accordingly, an outer diameter of the insertion portion 115 and an inner diameter of the knuckle bore 221 have a dimension that allows the transition fit or the clearance fit. Alternatively, the insertion portion 115 and the knuckle bore 221 may be formed such that an annular gap is formed between the outer circumferential surface of the insertion portion 115 and the inner circumferential surface 222 of the knuckle housing 220.

In one embodiment of the present disclosure, the knuckle housing 220 has an axial end surface 224 at an end portion in the outer axial direction AD1. The axial end surface 224 may have a shape corresponding to a shape of the mounting surface 121 of the mounting portion 120. In the example shown in FIG. 2, the axial end surface 224 has a round triangular shape, and the second mounting holes 223 are located in the vicinity of each of vertexes of the triangular shape. A plurality of second mounting holes 223 pass through the knuckle housing 220 from the axial end surface 224 in the inner axial direction AD2.

In the outer ring-knuckle assembly according to the embodiments of the present disclosure, each of the outer ring and the knuckle has a mating portion configured to mate each other. Accordingly, it is possible to prevent assembling between an outer ring having a mating portion and a knuckle not having a mating portion or assembling between an outer ring not having a mating portion and a knuckle having a mating portion. That is, the outer ring-knuckle assembly according to the embodiments of the present disclosure prevents incorrect assembling of an outer ring and a knuckle which are not paired and belong to different sorts.

The mating portion of the outer ring and the mating portion of the knuckle may have a mutually complementary shape and allow the outer ring and the knuckle to be coupled in the axial direction. The mating portion of the outer ring may be implemented as one of a mating protrusion and a step portion, and the mating portion of the knuckle may be implemented as the other one of a mating protrusion and a step portion.

In the outer ring-knuckle assembly according to the embodiments of the present disclosure, the mating protrusion has one shape among a plurality of mating shapes which are different from each other. The plurality of mating shapes may include shapes of a protrusion protruding in the axial direction AD with a shape such as a hexahedral shape, a cylindrical shape, a polygonal columnar shape, a hemispherical shape, a dome shape, a semi-cylindrical shape, a pyramid shape, a prism shape, and the like. A shape of the step portion may include a shape complementary to one of the mating shapes, i.e., a shape capable of accommodating the mating protrusion in the axial direction AD. In one embodiment of the present disclosure, the mating protrusion may have a shape of the mating protrusion shown in FIG. 2, and the step portion may have a shape of the step portion shown in FIG. 2.

As shown in FIG. 2, in the outer ring-knuckle assembly 20 according to one embodiment of the present disclosure, the outer ring 100 may comprise at least one mating protrusion 130 formed on the outer circumferential surface 114 of the body 110, and the knuckle 200 may comprise a step portion 230 configured to mate with the mating protrusion 130 in the axial direction of the body 110 (the outer axial direction AD1 or the inner axial direction AD2). The mating protrusion 130 and the step portion 230 may be formed such that the mating protrusion 130 is inserted into the step portion 230 when the mating protrusion 130 and the step portion 230 are matched in the axial direction AD. The mating protrusion 130 and the step portion 230 may be formed in size allowing the step portion 230 to accommodate the mating protrusion 130.

The mating protrusion 130 is located between the mounting portion 120 and the insertion portion 115 (at a boundary between the mounting portion 120 and the insertion portion 115) and protrudes in the inner axial direction AD2 and the outer radial direction RD1. The step portion 230 is located between the axial end surface 224 and the inner circumferential surface 222 of the knuckle housing 220 and is formed to be concave in the inner axial direction AD2 and the outer radial direction RD1. Further, the step portion 230 has an annular shape extending in the circumferential direction CD such that the knuckle 200 has one step portion 230 extending in the circumferential direction CD between the axial end surface 224 and the inner circumferential surface 222. When the mating protrusion 130 and the step portion 230 are matched in the axial direction AD, the mating protrusion 130 may be inserted into the step portion 230 in the inner axial direction AD2, and the mating protrusion 130 may be mated with the step portion 230 in the axial direction AD. The mating protrusion 130 may be mated with the step portion 230 such that the mounting surface 121 of the mounting portion 120 may be brought into contact with the axial end surface 224 of the knuckle 200. Further, the mating protrusion 130 may be mated with the step portion 230 such that a central axis CA3 of the first mounting hole 122 and a central axis CA4 of the second mounting hole 223 may be aligned to allow the bolt 300 to pass through.

With coupling and mating between the mating protrusion 130 and the step portion 230 in the axial direction AD, only the outer ring 100 and the knuckle 200 according to one embodiment of the present disclosure, which are paired, can be assembled with each other. Therefore, the outer ring-knuckle assembly configured such that when the mating protrusion 130 is matched to the step portion 230 in the axial direction AD, one of the mating protrusion and the step portion is configured to be inserted into the other thereof, can prevent incorrect assembling between the outer ring 100 and the knuckle which do not belong to the same sort and thus are not paired or incorrect assembling between the knuckle 200 and an outer ring which do not belong to the same sort and thus are not paired.

In one embodiment of the present disclosure, the mating protrusion 130 has an axial mating surface 131 and a radial mating surface 132 which are brought into contact with the step portion 230. A surface of the mating protrusion 130 in the inner axial direction AD2 forms the axial mating surface 131, and a surface of the mating protrusion 130 in the outer radial direction RD1 forms the radial mating surface 132. The axial mating surface 131 may be brought into contact with the step portion 230 in the inner axial direction AD2 or may be spaced apart from the step portion 230 in the inner axial direction AD2. The radial mating surface 132 may be brought into contact with the step portion 230 in the outer radial direction RD2 or may be spaced apart from the step portion 230 in an outer radial direction RD2. The axial mating surface 131 and the radial mating surface 132 extend in the circumferential direction CD and are curved with a predetermined curvature. The radial mating surface 132 may be in parallel with the central axis CA1. Alternatively, the radial mating surface 132 may be inclined with respect to the central axis CA1.

In one embodiment of the present disclosure, the step portion 230 has an axial mating surface 231 and a radial mating surface 232 which may be brought into contact with or spaced apart from the mating protrusion 130. An annular surface of the step portion 230 in the outer axial direction AD1 may form the axial mating surface 231, and an annular surface of the step portion 230 in the inner radial direction RD2 may form the radial mating surface 232. The axial mating surface 231 and the radial mating surface 232 may have an annular shape extending in the circumferential direction CD. Referring to FIG. 2, the radial mating surface 232 may be inclined with respect to the central axis CA2. The radial mating surface 232 may be inclined with respect to the central axis CA2 with an inclination angle that is greater than that of the radial mating surface 132.

In one embodiment of the present disclosure, when the outer ring 100 is coupled to the knuckle housing 220 of the knuckle 200 in the axial direction AD, the central axis CA3 of the plurality of first mounting holes 122 and the central axis CA4 of the plurality of the second mounting hole 223 may be aligned parallel to the central axis CA1 by mating of the mating protrusion 130 and the step portion 230. In this regard, the mating protrusion 130 and the step portion 230 may be disposed or positioned to allow the central axis CA3 and the central axis CA4 to be aligned parallel to the central axis CA1 For example, a boundary between the axial mating surface 131 and the radial mating surface 132 and a boundary between the axial mating surface 231 and the radial mating surface 232 may be disposed or positioned with respect to the central axis CA1 or the central axis CA2 so as to allow the central axis CA3 and the central axis CA4 to be aligned parallel to the central axis CA1.

The outer ring 100 shown in FIG. 2 has one mating protrusion 130. Alternatively, two mating protrusions may be disposed on the outer ring 100 within a semicircular section of the insertion portion 115. Alternatively, three or more mating protrusions may be disposed on the outer ring 100 within a circular section of the insertion portion 115 at regular or irregular intervals.

The step portion 230 extends in an annular shape between the inner circumferential surface 222 and the axial end surface 224. Alternatively, the step portion 230 may extend in an arc shape and may be formed at a position corresponding to the mating protrusion 130. In this embodiment, a length of the step portion 230 in the circumferential direction CD is greater than a length of the mating protrusion 130 in the circumferential direction CD. Consequently, the step portion 230 may mate with the mating protrusion 130 with a gap in the circumferential direction CD. Further, the step portion 230 is not necessarily formed to have a length exactly corresponding to the length of the mating protrusion 130 in the circumferential direction CD.

As shown in FIG. 2, according to one embodiment of the present disclosure, a mating portion of the outer ring 100 comprises the mating protrusion 130, and a mating portion of the knuckle 200 comprises the step portion 230. Alternatively, the mating portion of the outer ring may comprise the step portion 230, and the mating portion of the knuckle may comprise the mating protrusion 130. In this embodiment, the outer ring 100 may comprise the step portion 230 between the insertion portion 115 and the mounting portion 120, specifically on a boundary between the insertion portion 115 and the mounting portion 120, and the knuckle 200 may comprise the mating protrusion 130 protruding from the axial end surface 224 in the axial direction AD.

Referring to FIG. 2, the mounting portion 120 may have a round triangular shape. Alternatively, the mounting portion 120 may be formed in a ring shape, a quadrangular shape, or the like. Alternatively, the mounting portion 120 of the outer ring 100 may be formed on the outer circumferential surface of the body 110 as a plurality of protrusions, each having the first mounting hole 122 formed thereon. Alternatively, the outer ring 100 may have a sensor insertion hole (not shown) passing through from a surface of the mounting portion 120 to the inner circumferential surface 112 of the body 110. A detection portion of a sensor for detecting a wheel speed, a wheel acceleration, a wheel bearing load, and the like may be installed in such a sensor insertion hole. Further, the detection portion of the sensor may be installed to the wheel bearing assembly through the outer ring. In this embodiment, a sensor target (not shown) interacting with the detection portion may be attached to an outer circumferential surface of the bearing hub of the wheel bearing assembly.

Referring to FIG. 2, three first mounting holes 122 may be formed in the outer ring 100 and three second mounting holes 223 may be formed in the knuckle housing 220. Alternatively, the outer ring 100 may have four or more first mounting holes 122 and the knuckle 200 may have four or more second mounting holes 223.

Referring to FIG. 2, the bolt 300 may be inserted into the first mounting hole 122 through the second mounting hole 223 to be thread-engaged to the first mounting hole 122. Alternatively, the first mounting hole 122 may not have a female thread, whereas the second mounting hole 223 may have a female thread. In this embodiment, the bolt 300 may be inserted into the second mounting hole 223 through the first mounting hole 122 to be thread-engaged to the second mounting hole 223.

Referring to FIG. 2, the raceway surface 113 may be a flat surface which is inclined with respect to the central axis CA1. Alternatively, a raceway surface of the outer ring 100 may be formed of a curved surface extending in an annular shape and bent with respect to the central axis CA1 so as to be brought into contact with rolling elements such as a ball, and the wheel bearing assembly may comprise balls as a rolling elements.

Figure 3:
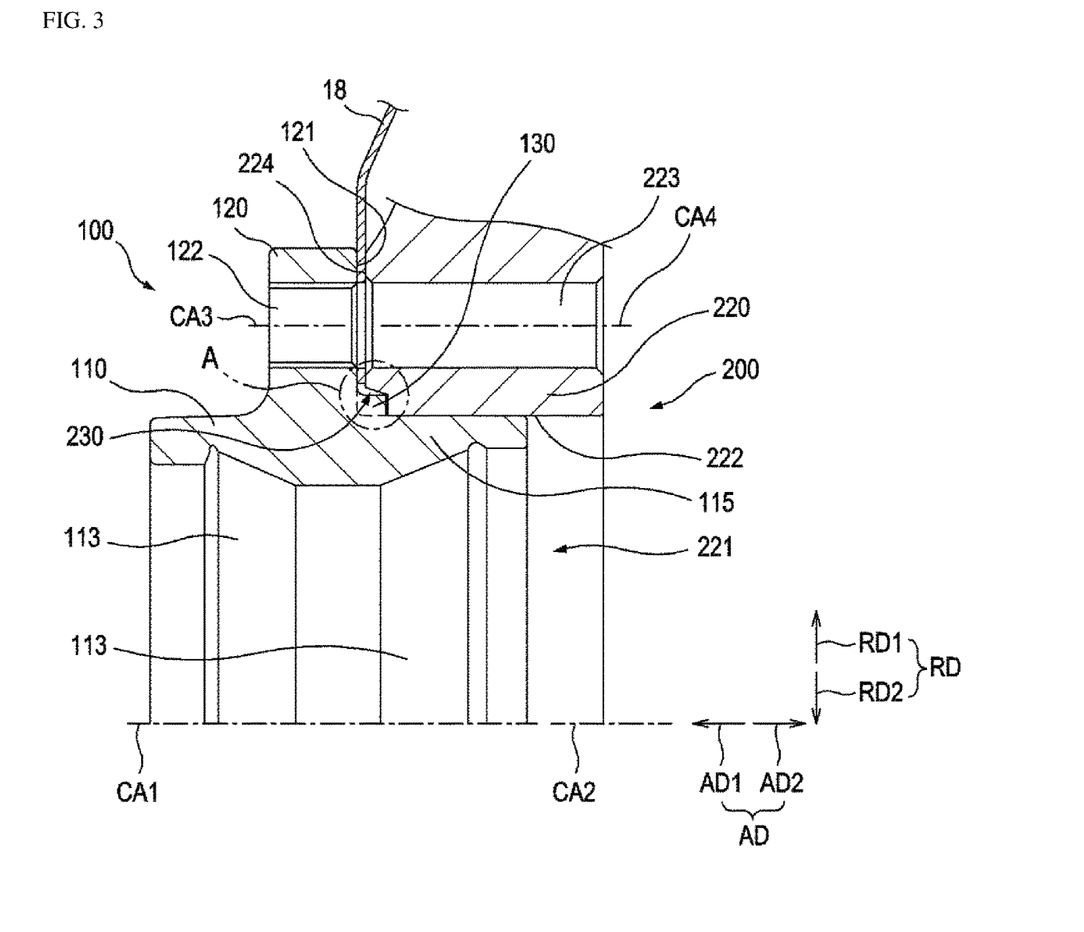
FIG. 3 is a cross-sectional view illustrating an example in which the outer ring and the knuckle according to one embodiment of the present disclosure are assembled.
Figure 4:
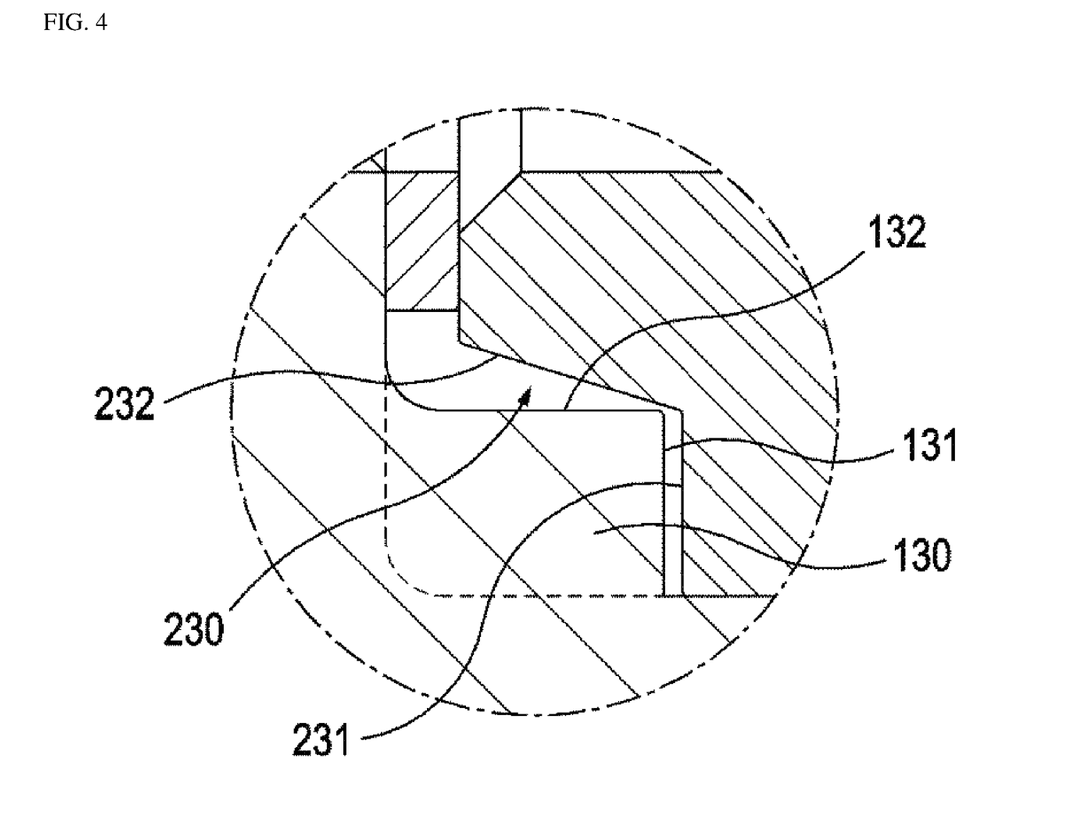
FIG. 4 is an enlarged view of a portion A in FIG. 3 and illustrates a mating protrusion and a step portion.

FIG. 3 illustrates an example in which the outer ring-knuckle assembly according to one embodiment of the present disclosure is assembled, and FIG. 4 illustrates an enlarged view of a portion A in FIG. 3 that shows the mating protrusion and the step portion. To facilitate understanding of a configuration of an error proofing structure provided in an outer ring and a knuckle, the outer ring and the knuckle which are shown in FIG. 3 are illustrated in a cross-sectional shape taken along line 1-1 and line 2-2 of FIG. 2.

Referring to FIGS. 3 and 4, the outer ring 100 and the knuckle 200 may be smoothly assembled through mating implemented by the mating protrusion 130 and the step portion 230. As the mating protrusion 130 mates with the step portion 230 in the axial direction AD, the axial mating surface 131 of the mating protrusion 130 is spaced a gap apart from the axial mating surface 231 of the step portion 230 in the axial direction AD. That is, the outer ring 100 may be coupled to the knuckle 200 with a gap between the mating protrusion 130 and the step portion 230. Alternatively, the axial mating surface 131 of the mating protrusion 130 may be brought into contact with the axial mating surface 231 of the step portion 230. The radial mating surface 132 of the mating protrusion 130 may be guided by the radial mating surface 232 of the step portion 230. As the mating protrusion 130 mates with the step portion 230 in the axial direction AD, the central axes CA3 and CA4 of the first mounting hole 122 of the outer ring 100 and the second mounting hole 223 of the knuckle 200 are aligned. Accordingly, the bolt 300 for coupling the outer ring 100 to the knuckle 200 may be engaged with the first mounting hole 122 through the second mounting hole 223.

Figure 5:
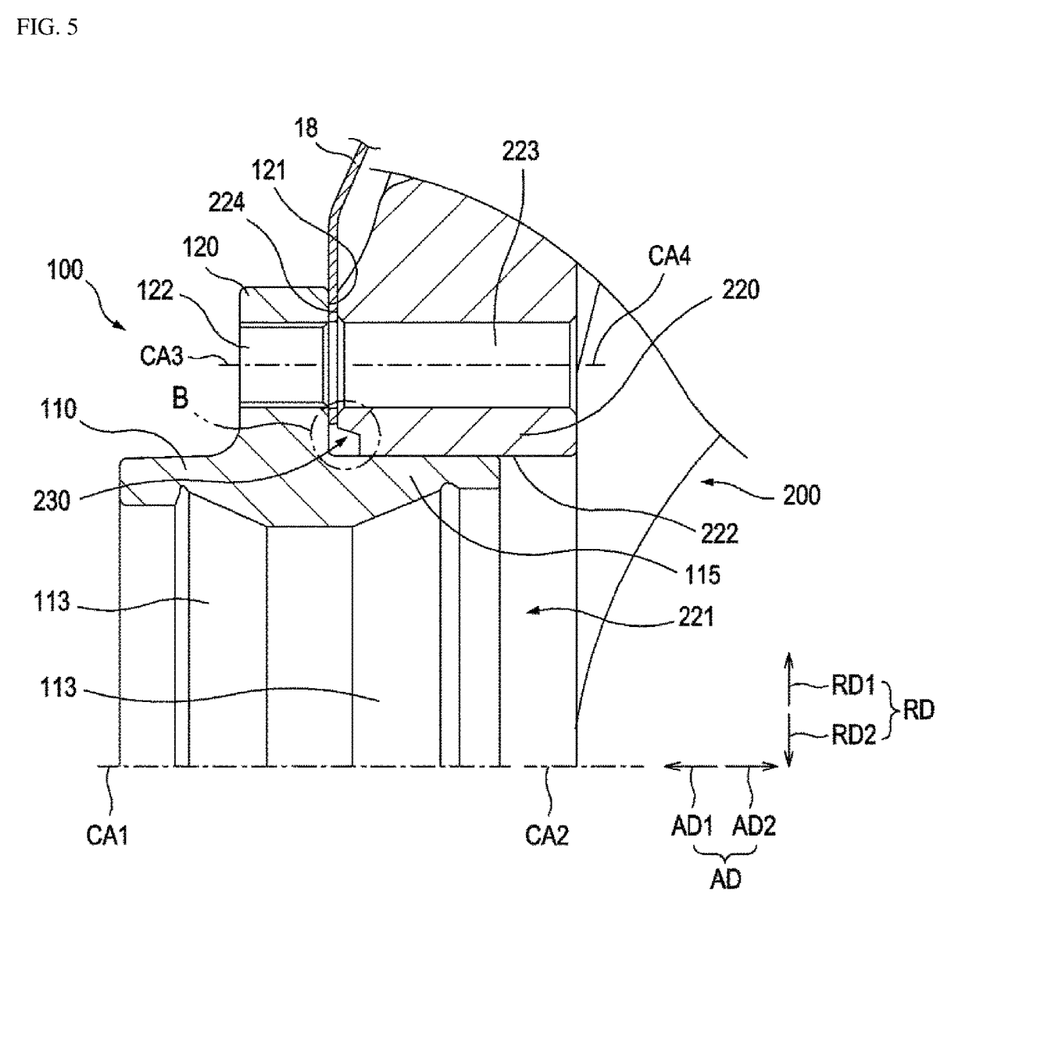
FIG. 5 is a cross-sectional view illustrating an example in which the outer ring and the knuckle according to one embodiment of the present disclosure are assembled.
Figure 6:
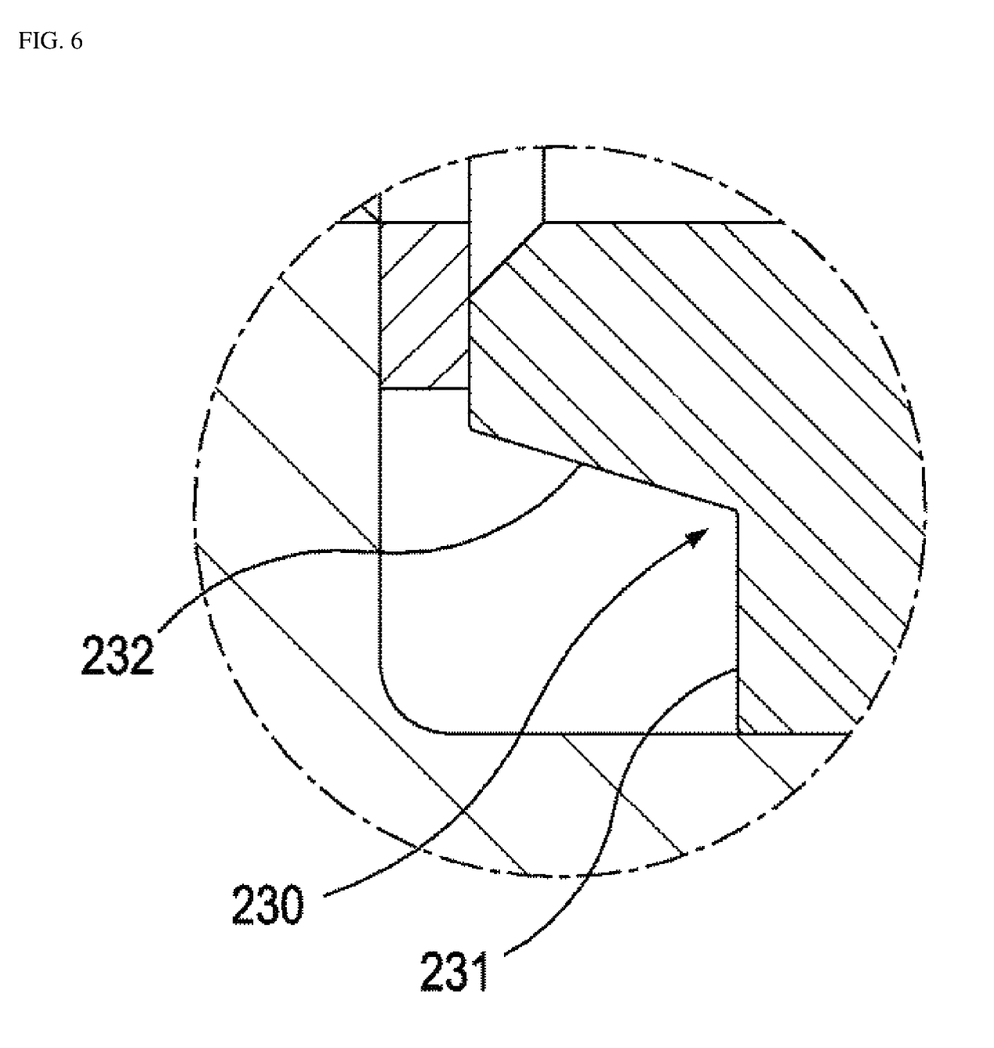
FIG. 6 is an enlarged view of a portion B in FIG. 5 and illustrates the step portion.

FIG. 5 illustrates an example in which the outer ring-knuckle assembly according to one embodiment of the present disclosure is assembled that includes cross-sectional shapes taken along line 3-3 and line 4-4 of FIG. 2. FIG. 6 is an enlarged view of a portion B in FIG. 5. Referring to FIGS. 5 and 6, the step portion 230 faces a boundary portion between the insertion portion 115 and the mounting portion 120.

Assuming an outer ring-knuckle assembly according to a comparative example, error proofing structure of the outer ring-knuckle assembly according to one embodiment of the present disclosure will be described. The outer ring and the knuckle according to one embodiment of the present disclosure, each having an outer diameter and an inner diameter which are paired, are assumed to belong to a first sort. An outer ring and a knuckle according to a comparative example, each having an outer diameter and an inner diameter which are paired, are assumed to belong to a second sort. The outer ring and the knuckle which belong to the second sort do not have the above-described mating protrusion and step portion. The outer ring and knuckle of the first sort may be provided together with the outer ring and knuckle of the second sort and assembled thereto at a site in which an outer ring is assembled to a knuckle. When the first sort and the second sort of the outer ring and knuckle are assumed as above, first to fourth assembly examples are considered for assembling of the outer ring and the knuckle. The first assembly example relates to the assembling of the outer ring and the knuckle according to one embodiment of the present disclosure shown in FIGS. 3 TO 6. The second assembly example relates to assembling of the outer ring and the knuckle which belong to the second sort. The third assembly example relates to assembling of the outer ring according to one embodiment of the present disclosure, which belongs to the first sort, and the knuckle according to a comparative example, which belongs to the second sort. The fourth assembly example relates to assembling of the outer ring according to a comparative example, which belongs to the second sort, and the knuckle according to one embodiment of the present disclosure, which belongs to the first sort.

Figure 7:
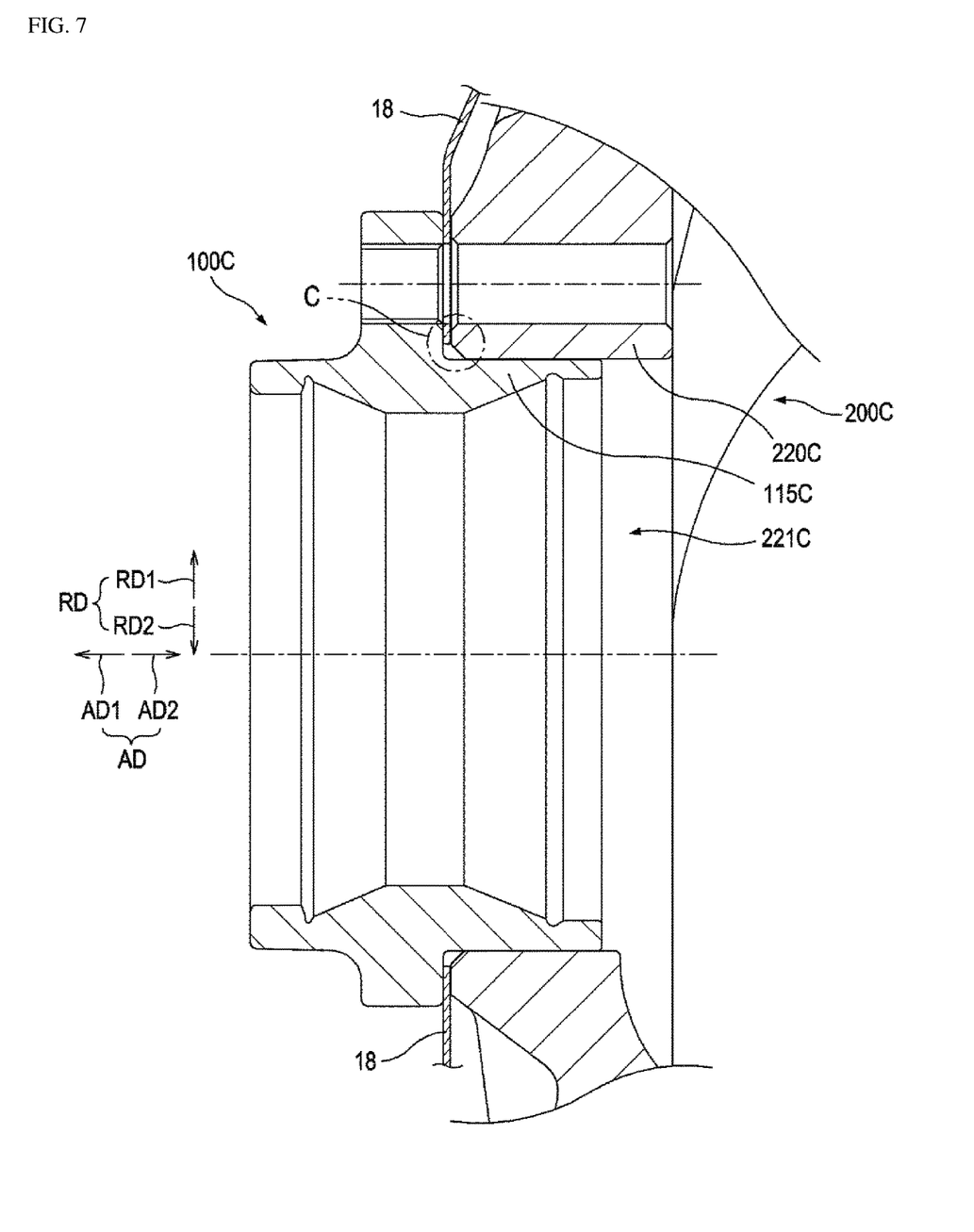
FIG. 7 is a sectional view illustrating an example in which an outer ring and a knuckle according to a comparative example are assembled.
Figure 8:
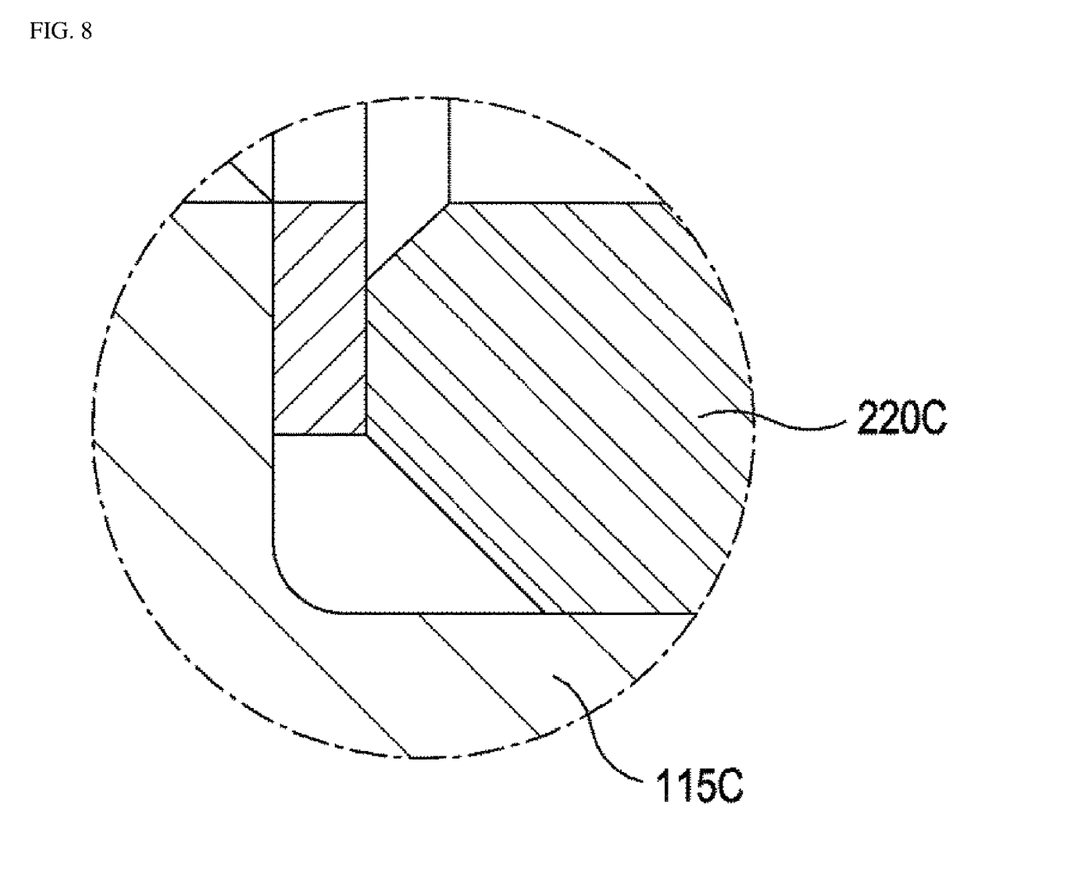
FIG. 8 is an enlarged view of a portion C in FIG. 7.

FIG. 7 is a sectional view illustrating an example in which the outer ring and the knuckle according to a comparative example are assembled and illustrates the second assembly example. FIG. 8 is an enlarged view of a portion C in FIG. 7. Referring to FIGS. 7 and 8, an outer ring 100C and a knuckle 200C according to a comparative example, which belong to the second sort, do not have the above-described mating protrusion and step portion.

An outer diameter of an insertion portion 115C of the second sort outer ring 100C is greater than that of the insertion portion of the first sort outer ring. An inner diameter of a knuckle bore 221C of a knuckle housing 220C of the second sort knuckle 200C is greater than that of the knuckle bore of the first sort knuckle. The outer ring 100C and the knuckle 200C, each having an outer diameter and an inner diameter which are paired, may be smoothly assembled.

Figure 9:
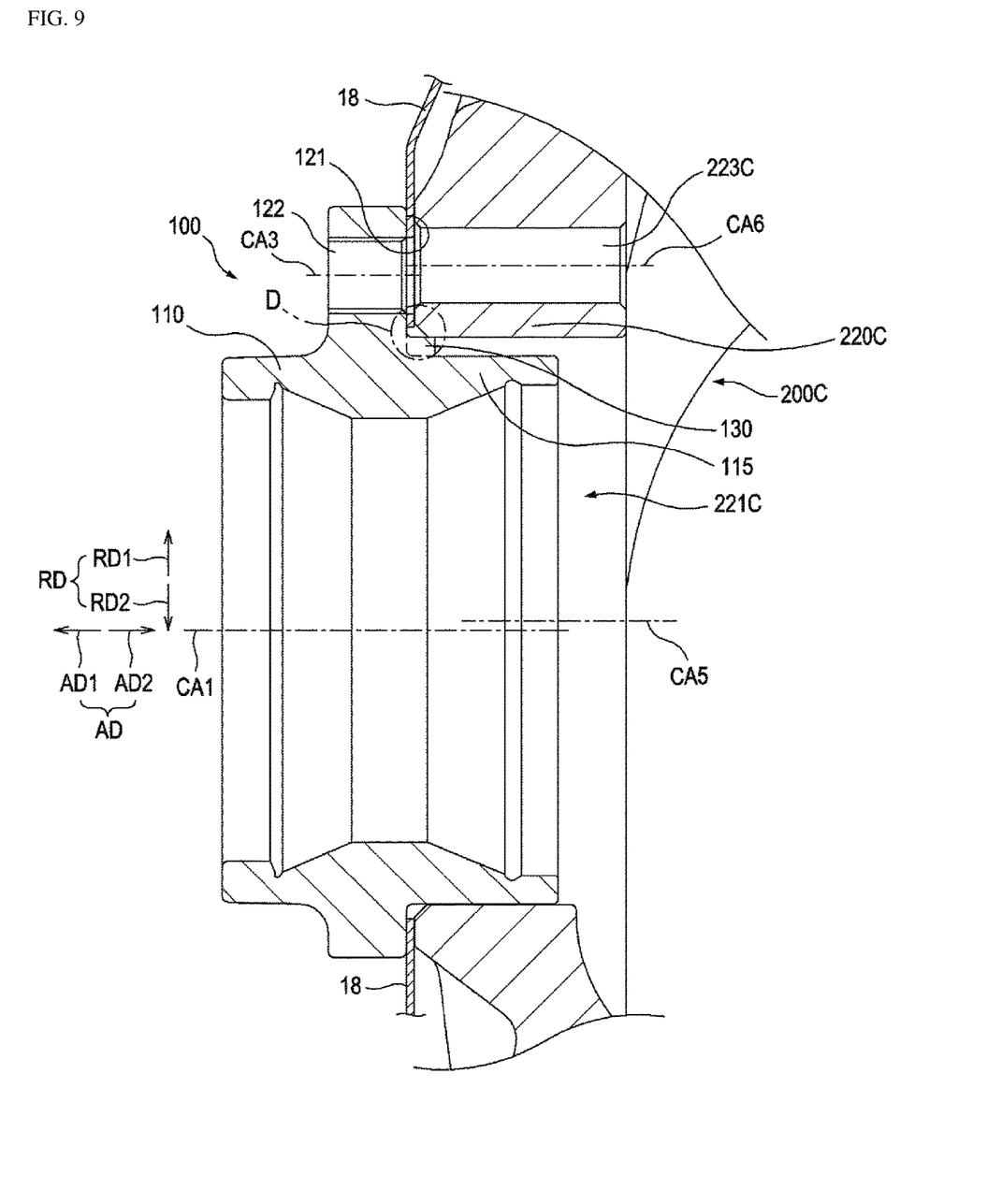
FIG. 9 is a cross-sectional view illustrating an example in which the outer ring according to one embodiment of the present disclosure cannot be assembled to the knuckle according to the comparative example.
Figure 10:
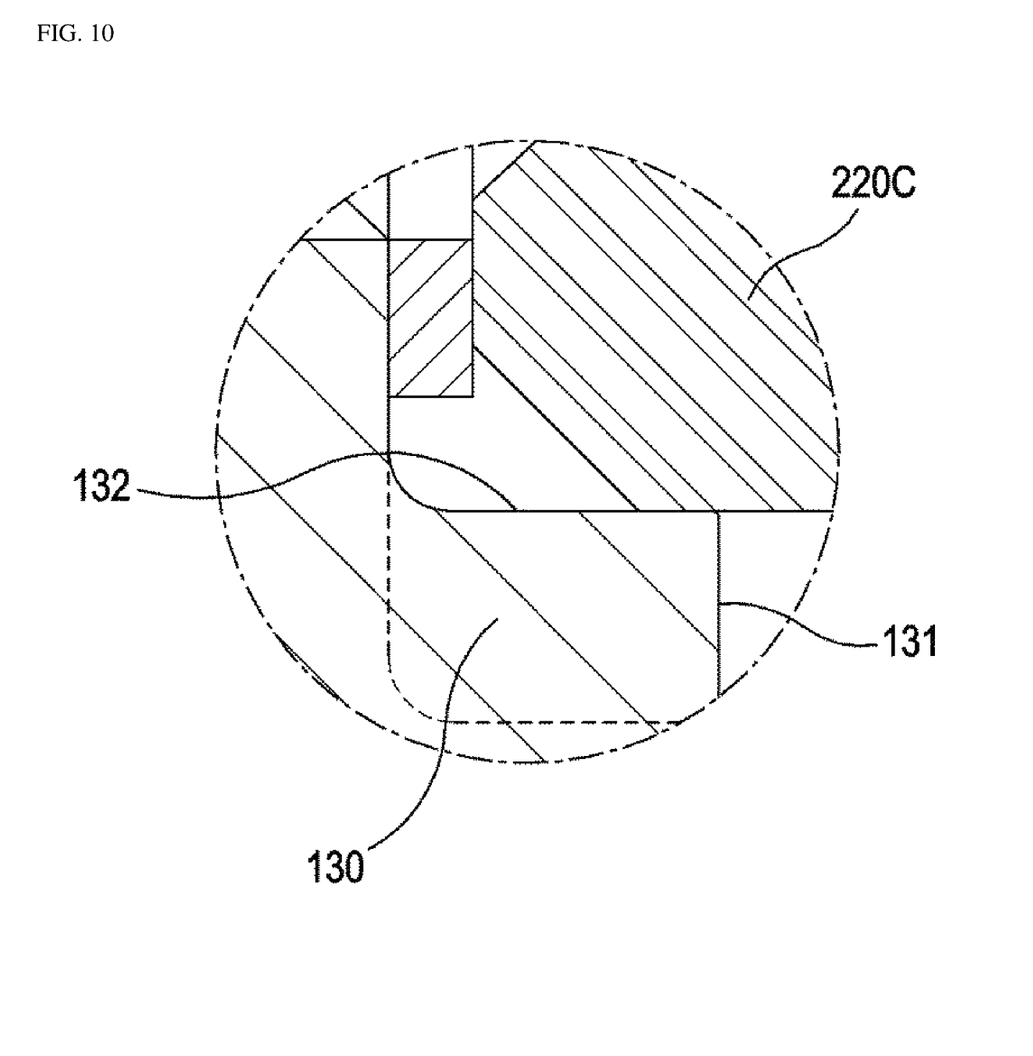
FIG. 10 is an enlarged view of a portion D in FIG. 9.

FIG. 9 is a cross-sectional view illustrating an example in which the outer ring according to one embodiment of the present disclosure cannot be assembled to the knuckle according to a comparative example and illustrates the third assembly example. FIG. 10 is an enlarged view of a portion D in FIG. 9. The outer ring shown in FIG. 9 is illustrated in a cross-sectional shape taken along the line 1-1 of FIG. 2.

Referring to FIGS. 9 and 10, the third assembly example relates to assembling of the outer ring 100 according to one embodiment of the present disclosure, which belongs to the first sort, and the knuckle 200C according to a comparative example, which belongs to the second sort. Since the outer diameter of the insertion portion 115 of the first sort outer ring 100 is smaller than the inner diameter of the knuckle bore 221C of the second sort knuckle 200C, the first sort outer ring 100 and the second sort knuckle 200C, each having the outer diameter and the inner diameter which are not paired, may be incorrectly assembled.

Referring to FIG. 9, the first sort outer ring 100 according to one embodiment of the present disclosure is being assembled to the second sort knuckle 200C which has the inner diameter that is greater than the outer diameter of the outer ring 100 (the outer diameter of the insertion portion 115) but does not have the step portion 230. Since the outer diameter of the insertion portion 115 is smaller than the inner diameter of the knuckle housing 220C, the insertion portion 115 may be inserted into the knuckle bore 221C of the knuckle housing 220C. However, when the mating protrusion 130 is inserted into the knuckle bore 221C, the central axis CA1 of the outer ring 100 cannot be aligned with a central axis CA5 of the knuckle 200C. Further, the central axis CA3 of the first mounting holes 122 cannot be aligned with a central axis CA6 of the mounting holes 223C of the knuckle 200C which are capable of corresponding to the first mounting holes 122. That is, due to the mating protrusion 130, the central axis CA3 is spaced apart from the central axis CA6 in the radial direction RD.

Due to the central axis CA3 and central axis CA6 which are not aligned, the bolt for coupling the outer ring 100 to the knuckle 200C cannot be engaged with the first mounting hole 122 through a mounting hole 223C. Consequently, the second sort knuckle 200C, which has the inner diameter that is greater than the outer diameter of the first sort outer ring 100 but does not have the above-described step portion, cannot be assembled with the first sort outer ring 100. Further, even though the operator inserts the insertion portion 115 of the outer ring 100 into the knuckle housing 220C to some extent, the operator may recognize that the bolt cannot be inserted into the first mounting hole 122 of the outer ring and the mounting hole 223C of the knuckle 200C, which are not aligned, thereby easily recognizing a situation in which the outer ring and the knuckle which are not paired are being assembled.

The fourth assembly example relates to assembling of the outer ring according to a comparative example, which belongs to the second sort, and the knuckle according to one embodiment of the present disclosure, which belongs to the first sort. Since the outer diameter of the second sort outer ring is greater than the inner diameter of the first sort knuckle, the second sort outer ring cannot be assembled with the first sort knuckle.

Although the technical spirit of the present disclosure has been described by way of some embodiments and examples shown in the accompanying drawings, it should be noted that various substitutions, modification, and alterations can be devised by those skilled in the art to which the present disclosure pertains without departing from the technical spirit and scope of the present disclosure. Further, it should be construed that these substitutions, modifications, and variations are included within the scope of the appended claims.

What is claimed is:

1. An assembly of an outer ring used in a wheel bearing and a knuckle for connecting the outer ring to a suspension system, the assembly comprising:
   the outer ring comprising a body having a hollow formed in an axial direction of a rotation axis, and a mounting portion extending in an outer radial direction and a circumferential direction of the body and having a plurality of first mounting holes formed thereon; and
   the knuckle configured to accommodate a portion of the body in the axial direction and having a plurality of second mounting holes corresponding to the plurality of first mounting holes,
   wherein the outer ring comprises one of a mating protrusion and a step portion into which the mating protrusion is inserted when the step portion is matched with the mating protrusion in an axial direction of the body,
   the knuckle comprises the other one of the mating protrusion and the step portion,
   the mating protrusion is formed to protrude from an outer circumferential surface of the outer ring in the outer radial direction or to protrude from an inner circumferential surface of the knuckle in an inner radial direction opposite to the outer radial direction, and
   the mating protrusion is configured to partially extend in the circumferential direction.

2. The assembly according to claim 1, wherein the step portion has an annular shape extending in the circumferential direction.

3. The assembly according to claim 2, wherein the step portion has an annular-shaped axial mating surface extending in the circumferential direction.

4. The assembly according to claim 1, wherein the mating protrusion has an axial mating surface which matches to the step portion in the axial direction.

5. The assembly according to claim 4, wherein the axial mating surface of the mating protrusion extends in the circumferential direction and is curved.

6. The assembly according to claim 1, wherein the outer ring and the knuckle are assembled with a gap between the mating protrusion and the step portion.

7. The assembly according to claim 1, wherein the mating protrusion and the step portion are disposed such that the plurality of first mounting holes and the plurality of second mounting holes are aligned when the outer ring and the knuckle are assembled in the axial direction.

8. The assembly according to claim 1, wherein:
   the body has an insertion portion formed between an axial end portion and the mounting portion, and the mating protrusion formed on the mounting portion and the insertion portion;
   the knuckle has a knuckle housing formed to accommodate the insertion portion in the axial direction, and the step portion formed between an axial end surface of the knuckle housing and an inner circumferential surface of the knuckle housing; and
   the plurality of second mounting holes are formed on the axial end surface of the knuckle housing.

9. The assembly according to claim 8, wherein the inner circumferential surface of the knuckle housing is formed to be fitted onto an outer circumferential surface of the insertion portion in the axial direction.

10. The assembly according to claim 1, further comprising:
    a plurality of bolts engaged to the plurality of first mounting holes and the plurality of second mounting holes.

11. The assembly according to claim 1, wherein:
    the mating protrusion has an axial mating surface which is brought into contact with the step portion in the axial direction;
    the step portion has an annular-shaped axial mating surface which is brought into contact with an axial mating surface of the mating protrusion and extends in the circumferential direction; and the axial mating surface of the mating protrusion extends in the circumferential direction and is curved.

12. A wheel bearing assembly, comprising:
a bearing hub coupled to a wheel and configured to be rotated with the wheel around a rotation axis;
an outer ring comprising a body having a hollow formed in an axial direction of the rotation axis and configured to surround a portion of the bearing hub, and a mounting portion extending in an outer radial direction and a circumferential direction of the body and having a plurality of first mounting holes formed thereon;
a plurality of rolling elements disposed between the bearing hub and the outer ring; and
a knuckle configured to accommodate a portion of the body and connect the outer ring to a suspension system, and having a plurality of second mounting holes corresponding to the plurality of first mounting holes,
wherein the outer ring comprises one of a mating protrusion and a step portion, into which the mating protrusion is inserted, when the step portion is matched with the mating protrusion in the axial direction of the body,
the knuckle comprises the other one of the mating protrusion and the step portion,
the mating protrusion is formed to protrude from an outer circumferential surface of the outer ring in the outer radial direction or to protrude from an inner circumferential surface of the knuckle in an inner radial direction opposite to the outer radial direction, and
the mating protrusion is configured to partially extend in the circumferential direction.

13. The wheel bearing assembly according to claim 12, wherein the step portion has an annular shape extending in the circumferential direction.

14. The wheel bearing assembly according to claim 12, wherein:
the mating protrusion has an axial mating surface which is brought into contact with the step portion in the axial direction;
the step portion has an annular-shaped axial mating surface which is brought into contact with an axial mating surface of the mating protrusion and extends in the circumferential direction; and
the axial mating surface of the mating protrusion extends in the circumferential direction and is curved.

15. The wheel bearing assembly according to claim 12, wherein:
the body has an insertion portion formed between an axial end portion and the mounting portion, and the mating protrusion formed on the mounting portion and the insertion portion;
the knuckle has a knuckle housing formed to accommodate the insertion portion in the axial direction, and the step portion formed between an axial end surface of the knuckle housing and an inner circumferential surface of the knuckle housing; and
the plurality of second mounting holes are formed on the axial end surface of the knuckle housing.

\* \* \* \* \*